US005473320A

United States Patent [19]
DeLuca et al.
[11] Patent Number: 5,473,320
[45] Date of Patent: Dec. 5, 1995

[54] APPARATUS AND METHOD FOR CONFIGURING THE PRESENTATION OF RECEIVED MESSAGES BASED ON TIME

[75] Inventors: Joan S. DeLuca, Boca Raton; Thomas F. Holmes, Boynton Beach, both of Fla.

[73] Assignee: Motorola, Inc., Schaumburg, Ill.

[21] Appl. No.: 255,547

[22] Filed: Jun. 6, 1994

Related U.S. Application Data

[63] Continuation of Ser. No. 880,387, May 8, 1992, abandoned.

[51] Int. Cl.[6] .................... H04Q 1/00
[52] U.S. Cl. .................... 340/825.44; 364/251.4
[58] Field of Search .................... 340/825.44; 455/38.1; 364/251.4, 252.5, 253.1

[56] References Cited

U.S. PATENT DOCUMENTS

| | | | |
|---|---|---|---|
| 4,385,295 | 8/1983 | Willard et al. . | |
| 4,412,217 | 10/1983 | Willard et al. . | |
| 4,438,433 | 3/1984 | Smoot | 340/825.44 |
| 4,894,649 | 1/1990 | Davis . | |
| 4,896,306 | 1/1990 | Sanbongi et al. . | |
| 5,140,561 | 8/1992 | Miyashita | 340/825.44 |
| 5,239,679 | 8/1993 | Murai | 340/825.44 |
| 5,241,305 | 8/1993 | Fascenda | 340/825.44 |

OTHER PUBLICATIONS

Motorola system planner, "Minitor II Alert Monitor Receiver Alerting Systems R4–2–51A" p. 4 published 1987 by Motorola, Inc.

*Primary Examiner*—Brian Zimmerman
*Attorney, Agent, or Firm*—Kelly A. Gardner; Daniel K. Nichols; John H. Moore

[57] ABSTRACT

A method for configuring the presentation of received messages comprises the steps of user selectably defining (302) a period of time during which a visual representation of messages received during the period of time will be visually presented, and receiving (304) the messages during the period of time. During the period of time, a further step includes presenting (306) information about the messages received during the period of time on a standby information display. A still further step includes presenting (306) information about messages received during a subsequent period of time on the standby information display after expiration of the period of time.

12 Claims, 6 Drawing Sheets

APPARATUS AND METHOD FOR CONFIGURING THE PRESENTATION OF RECEIVED MESSAGES BASED ON TIME

This is a continuation of application Ser. No. 07/880,387, filed May 8, 1992 now abandoned.

FIELD OF THE INVENTION

This invention relates in general to memory configuration in selective call receivers, and more specifically to a method and apparatus for configuring the presentation of received messages with respect to time.

BACKGROUND OF THE INVENTION

Selective call receivers, such as pagers, alert a user when a message has been received. In conventional pagers, received messages are stamped with a date and a time corresponding thereto and are stored in a memory. The pager alerts the user that a message has been received and either automatically or manually, upon selection by the user, presents the user with the message. At a later time, if the user desires to be presented with a particular message, he must scroll through the messages stored in memory until he locates the particular message. Although the number of messages that could be stored is theoretically limitless, typical pagers store only a predetermined number of messages. When the predetermined number of messages has been stored, each new message is saved in the memory, while the oldest stored message is deleted from the memory. To an extent, the user is able to save designated messages in the memory by directing the pager to protect the designated messages, thereby preventing the deletion of the designated messages from the memory. The user may not, however, protect more than the predetermined number of messages that can be stored, and, once the stored protected messages have taken all of the available space in the memory, no new messages may be stored or protected. In pagers with smaller memories, the user may perform the above mentioned operations with relative ease. However, performing basic pager operations, such as recalling messages and determining which messages are protected, may be problematic for the user when the predetermined number of messages that can be stored is high, i.e., the memory of the pager is of sufficient size to store a large number of messages. In this case, for example, the user may not know which messages are in danger of deletion or even which messages are stored. If the user attempts to locate a particular message, he may have to scroll through a large number of stored messages before the message is presented, thereby wasting time. After scrolling through the stored messages, the user may even realize that an important message has been deleted unintentionally. Such essential pager operations may be rendered unmanageable when the size of the pager memory is large enough to store more than a small number of messages.

Some conventional pagers are able to identify different types of messages, e.g., alphanumeric or numeric. The different types of messages may be identified in a number of ways, such as by an address of the incoming message. However, the user is unable to determine the type of received message without being presented with the message. This may inconvenience the user, for example, if he prefers to read only particular types of messages during certain times. This situation could arise if the pager types are categorized into work related messages and non-work related messages. The user may desire to read the work related messages while at the office during the day and the non-work related messages during the evening. Unfortunately, the user typically must read the message to determine whether the message is work related or non-work related. The user could begin to read a message before deciding that he would rather read the message at a later time, thereby wasting time.

Thus, what is needed is a method for better configuring the presentation of received messages and types of received messages based upon time.

SUMMARY OF THE INVENTION

According to a first aspect of the present invention, a selective call receiver for presenting a plurality of messages to a user, including a receiver for receiving messages, a timer for recording times that the messages are received, a memory for storing the messages and the times corresponding thereto, and controls for user selectably defining a previous time range. A presenting circuit within the selective call receiver presents a standby information display that is automatically generated in response to the previous time range, wherein the standby information display includes icons representative of messages received during the previous time range.

According to a second aspect of the present invention, a selective call receiver has a display. A method, in the selective call receiver, for configuring the presentation of received messages includes the steps of user selectably defining, without resetting the selective call receiver, a period of time during which information about messages received during the period of time will be visually presented and receiving the messages during the period of time. The method further includes the step of presenting, substantially coincident with the receiving step, the information about the messages received during the period of time on a standby information display, wherein the information included in the standby information display is distinct from the messages themselves. After expiration of the period of time, information about messages received during a subsequent period of time on the standby information display is presented automatically and without further user intervention.

DESCRIPTION OF A PREFERRED EMBODIMENT

Figure 1:
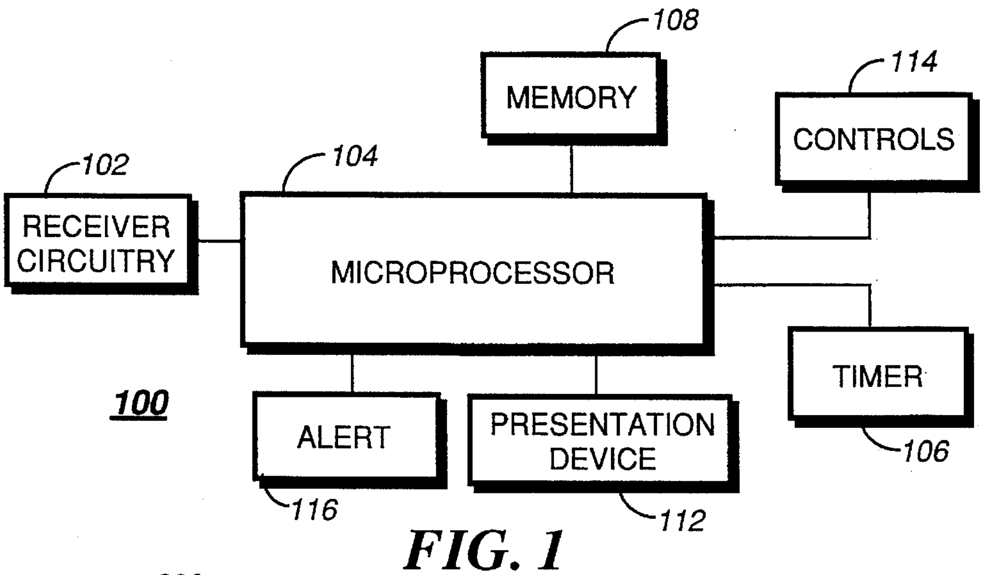
FIG. 1 shows a block diagram of a selective call receiver in accordance with a preferred embodiment of the present invention.

Referring to FIG. 1, a selective call receiver 100, such as a pager, comprises receiver circuitry 102 for receiving and demodulating an information signal containing message data, and a microprocessor 104 coupled to the receiver circuitry 102 for processing the information signal to decode an address and the message data contained therein. In addition, in accordance with a preferred embodiment of the present invention, the microprocessor 104 identifies the type of message received and processes the message accordingly. A timer 106 provides time information to the microprocessor 104 to allow the microprocessor 104 to record a time when the message is received, subsequent to which the message and the corresponding time are stored in a memory 108. In accordance with the preferred embodiment of the present invention, the memory 108 is of sufficient size to store numerous messages, including times corresponding to the messages. The message and the corresponding time may be presented on a presentation device 112 automatically or, when controls 114 are manipulated by the user, manually. In operation, the microprocessor 104 compares the address contained in the signal with predetermined addresses contained in the memory 108 and alerts the user by an alert mechanism 116 that a message has been received.

Figure 2:
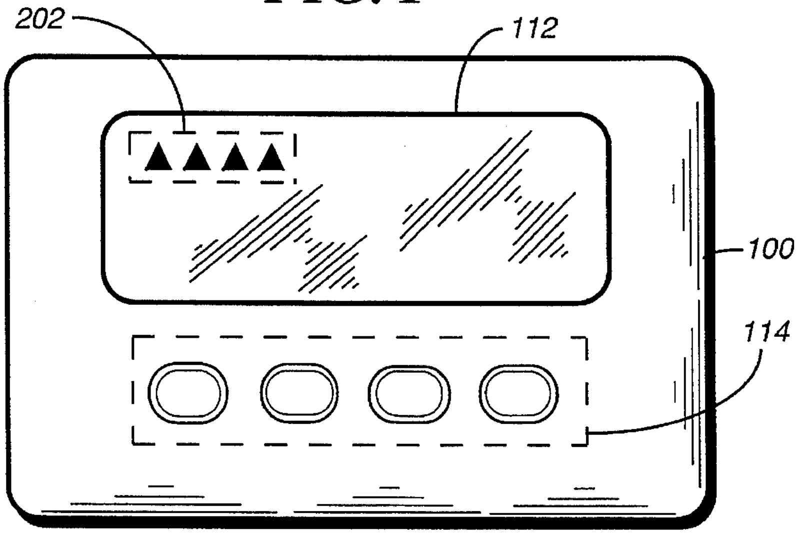
FIG. 2 is an illustration of a selective call receiver incorporating a standby information display in accordance with the preferred embodiment of the present invention.

Referring to FIG. 2, a pager in accordance with the preferred embodiment of the present invention further comprises a standby information display 202 generated in response to at least one message criteria. The user is able, by manipulation of the controls 114, to define the message criteria. The message criteria may, for example, be defined by a period of time determined by the user. During this period of time, information about the messages received during the period of time is presented by the presentation device 112 in the form of the standby information display 202. The standby information display 202 may include information such as the number of messages that have been received during the period of time or which of the messages received during the period of time have been read by the user. When the period of time has expired, the standby information display 202 is cleared of the information about the messages received during that time, and a new standby information display 202 is generated in response to messages received during a subsequent period of time. For example, if the user selects, via the controls 114, a 24 hour period, information about messages received during the 24 hour period will be displayed on the standby information display 202. When 24 hours has elapsed, the information will be cleared, and the standby information display 202 will display information about messages received during the next 24 hour period.

Figure 3:
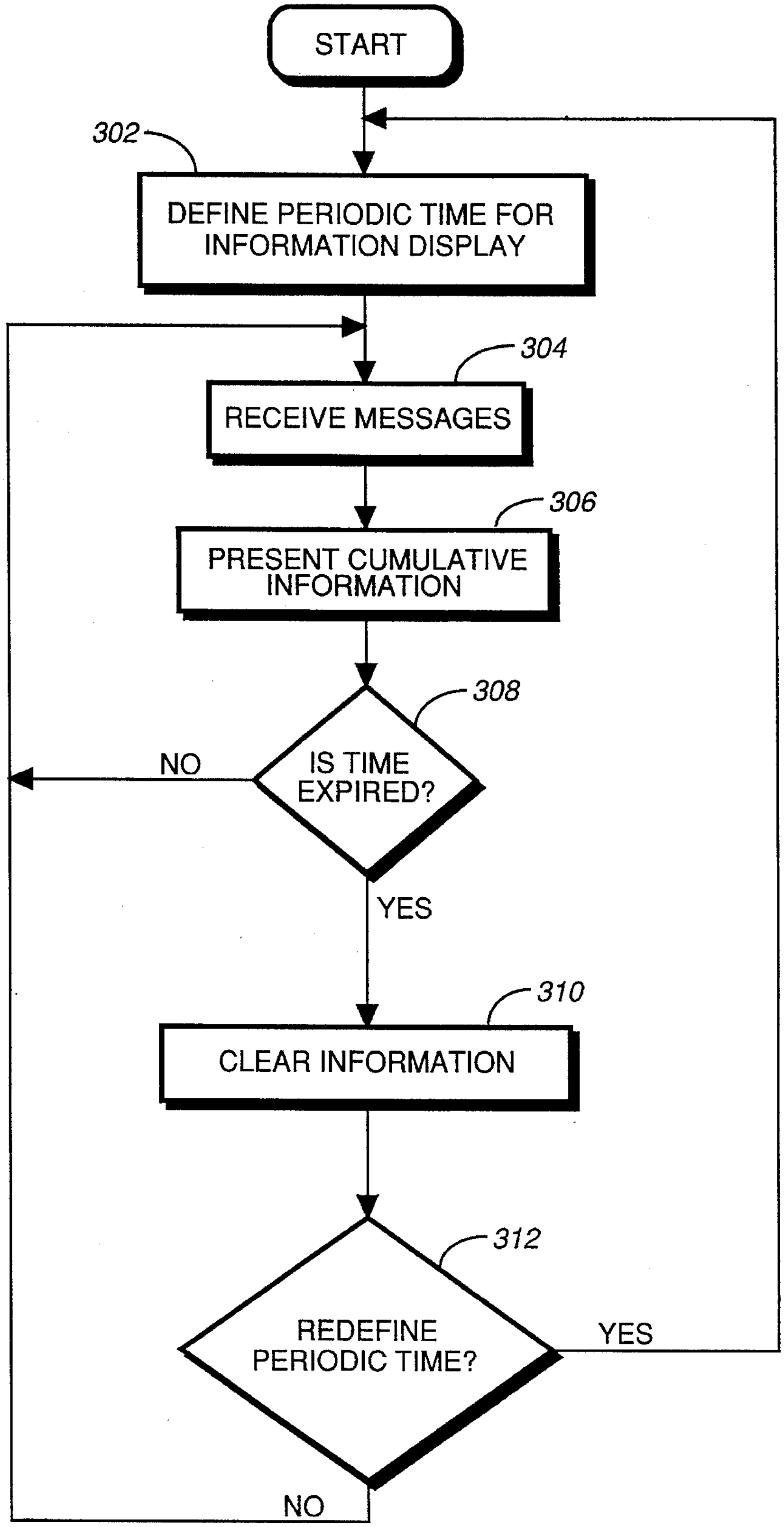
FIG. 3 is a flowchart illustrating a method of defining a standby information display generated in response to a message criteria in accordance with the preferred embodiment of the present invention.

Referring next to FIG. 3, a method of defining the standby information display 202 is illustrated. The user operates the controls 114 to define 302 a period of time in which information about the messages received 304 during the period of time is displayed 306 on the standby information display 202. The microprocessor 104 (FIG. 1) monitors the time, and, when the period of time has expired 308, the standby information display 202 is cleared 310 of the information about the previously received messages. Information about messages received 304 during a subsequent period of time is then displayed 306 on the standby information display 202. The user may choose to redefine 312 the period of time at any time during normal operation of the pager.

Figure 4:
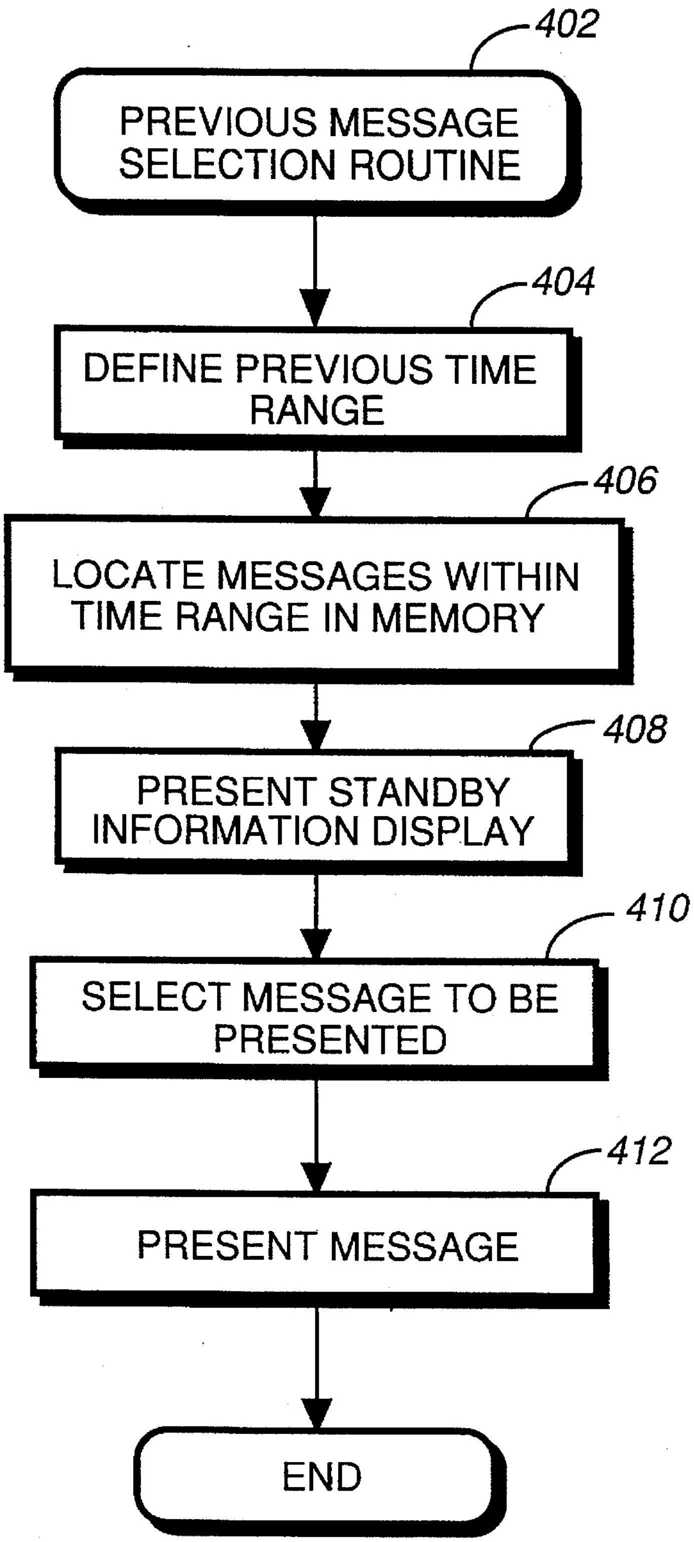
FIG. 4 is a flowchart illustrating a method of retrieving and presenting previously received messages in accordance with the preferred embodiment of the present invention.

FIG. 4 depicts a previous message retrieval subroutine, in which the user may choose to be presented with previously received messages, in accordance with the preferred embodiment of the present invention. Referring to FIG. 4, the user defines 404 a previous time range in which he is interested. This step is performed manually by user manipulation of the controls 114 (FIG. 2). The microprocessor 104 (FIG. 1) locates 406 the messages received during the previous time range in the memory 108. Thereafter, information about the messages is presented 408 in the area of the presentation display 112 (FIG. 2) defined as the standby information display 202. The user may select 410 any of the previously received messages from the standby information display for subsequent presentation 412 by the presentation device 112. After the user has read the message or messages in which he is interested, the pager resumes normal operation and continues to display the information about the messages received 304 during the period of time on the standby information display 202. This feature would be particularly convenient in pagers with large memories. The user of a pager with a large memory may, for example, have extreme difficulty in locating a previously received message. If the message was received hours or even days previously, the user may be forced to scroll through large numbers of messages, reading each message as it is presented, before he locates the particular message, thereby wasting time. The use of the standby information display, however, advantageously allows the user to selectively recall previously received messages based on time.

Figure 5:
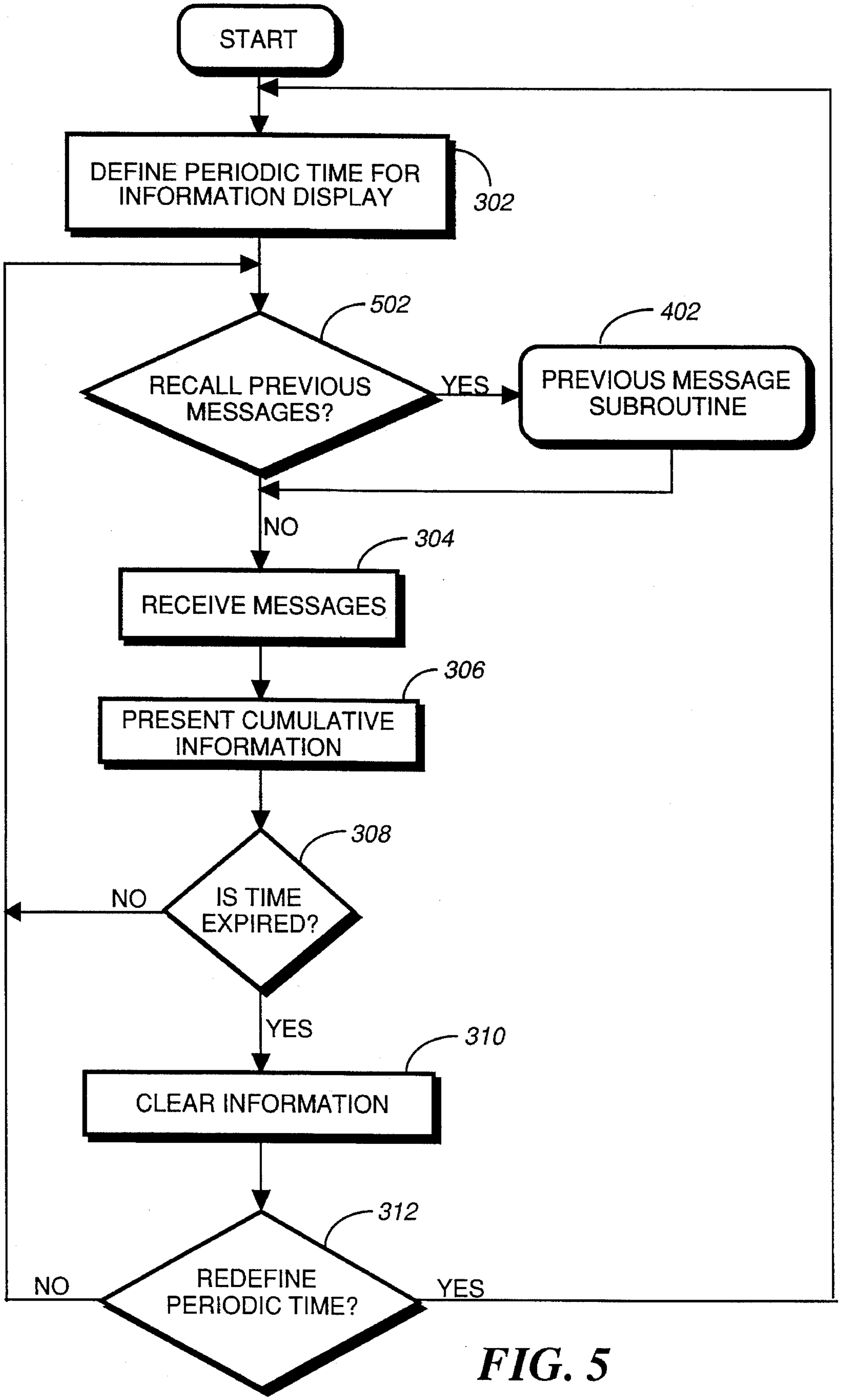
FIG. 5 is a flowchart illustrating a method of defining a standby information display generated in response to a message criteria and a method of retrieving and presenting previously received messages in accordance with the preferred embodiment of the present invention.

FIG. 5 combines the operations of FIG. 3 and FIG. 4. In accordance with the preferred embodiment of this invention, a method of defining the standby information display further comprises the step of allowing the user to recall 502 messages received during a previous time range. After the user has been presented 412 with the previously received message in which he is interested, normal pager operation resumes. Although the additional step 502 is shown as occurring prior to receiving 304 the messages, it may actually occur at any time during normal operation of the pager.

Because, in accordance with the preferred embodiment of the present invention, information about received messages is displayed on the standby information display, the user is able to easily understand information about the received messages. For example, the user can see, at a glance, how many messages he has received during a particular time period, how many of the messages he has yet to read, which messages are protected from deletion, etc. The user may also quickly recall previously received messages from the memory, thereby eliminating the time-wasting step of scrolling through a large number of messages before reading the desired message.

The pager in accordance with the preferred embodiment of the present invention may also incorporate other features, such as identifying the type of message. Additionally, the user may advantageously specify particular times during which different types of messages are presented in different ways. For example, the user may designate messages received on one address as work related and messages received on another address as non-work related. By use of the controls 114 (FIG. 2) on the pager, the user can specify the different hours during which it is important to be presented with each type of message. The user may, for example, specify the hours between 8:00 a.m. and 5:00 p.m. as a time period during which it is important to be presented with work related messages. During this time, when the pager receives work related messages, the user may choose to be alerted by an audible alert. In accordance with the preferred embodiment of the present invention, the pager, however, continues to receive the other types of messages which may be presented in different ways. A non-work related message, for example, received during this time may be announced by a silent alert or only indicated as an unread message on the standby information display. Although the user may choose not to read the non-work related message during the work day, he will be able to recall the message at any time. Additionally, because the pager automatically switches the ways in which the types of messages are presented at the appropriate times, the user cannot accidentally forget to switch the pager to the non-work related address when he leaves the office.

Figure 6:
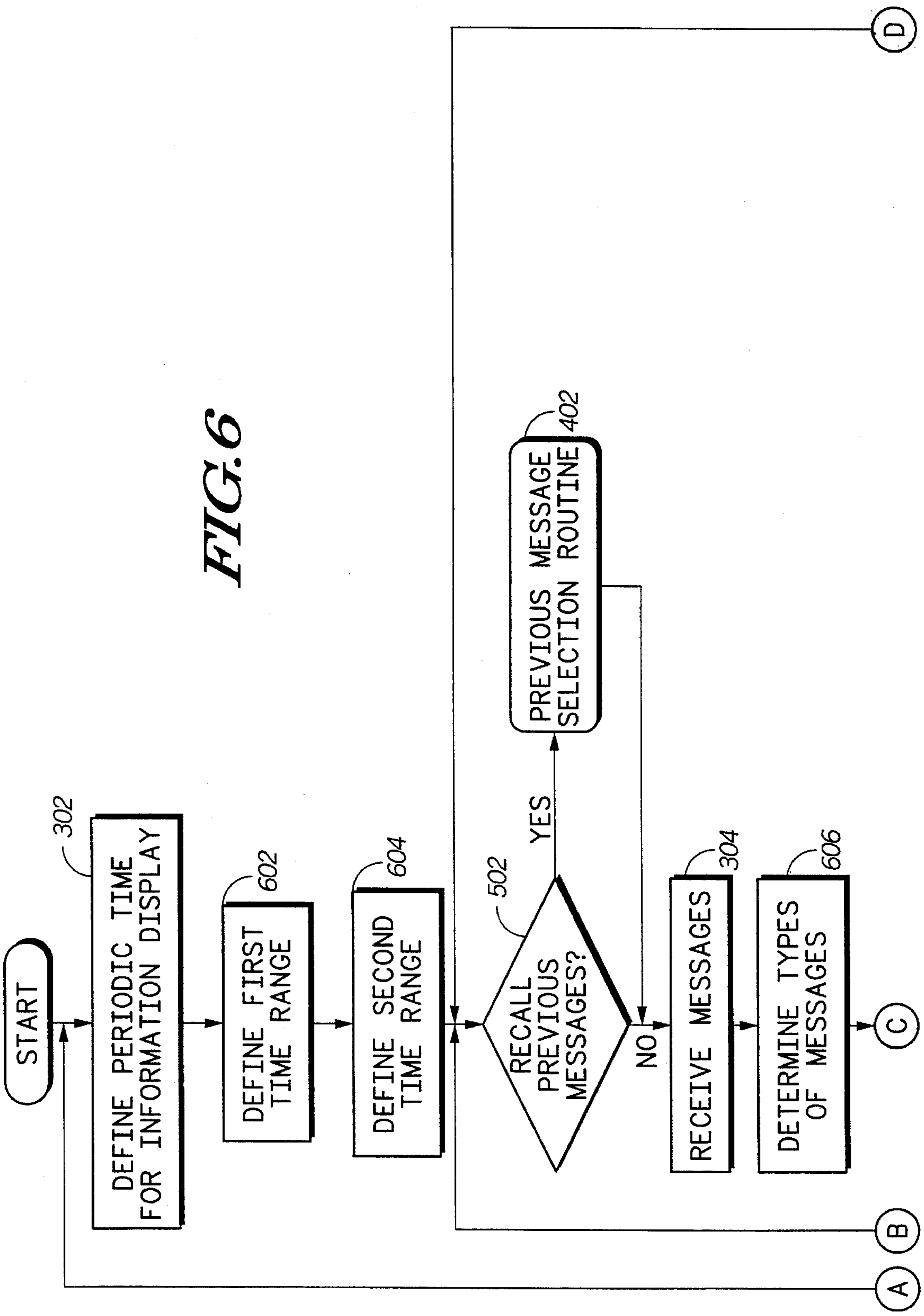
FIGS. 6 and 7 depict a method for defining a standby information display generated in response to several message criteria in accordance with the preferred embodiment of the present invention.
Figure 7:
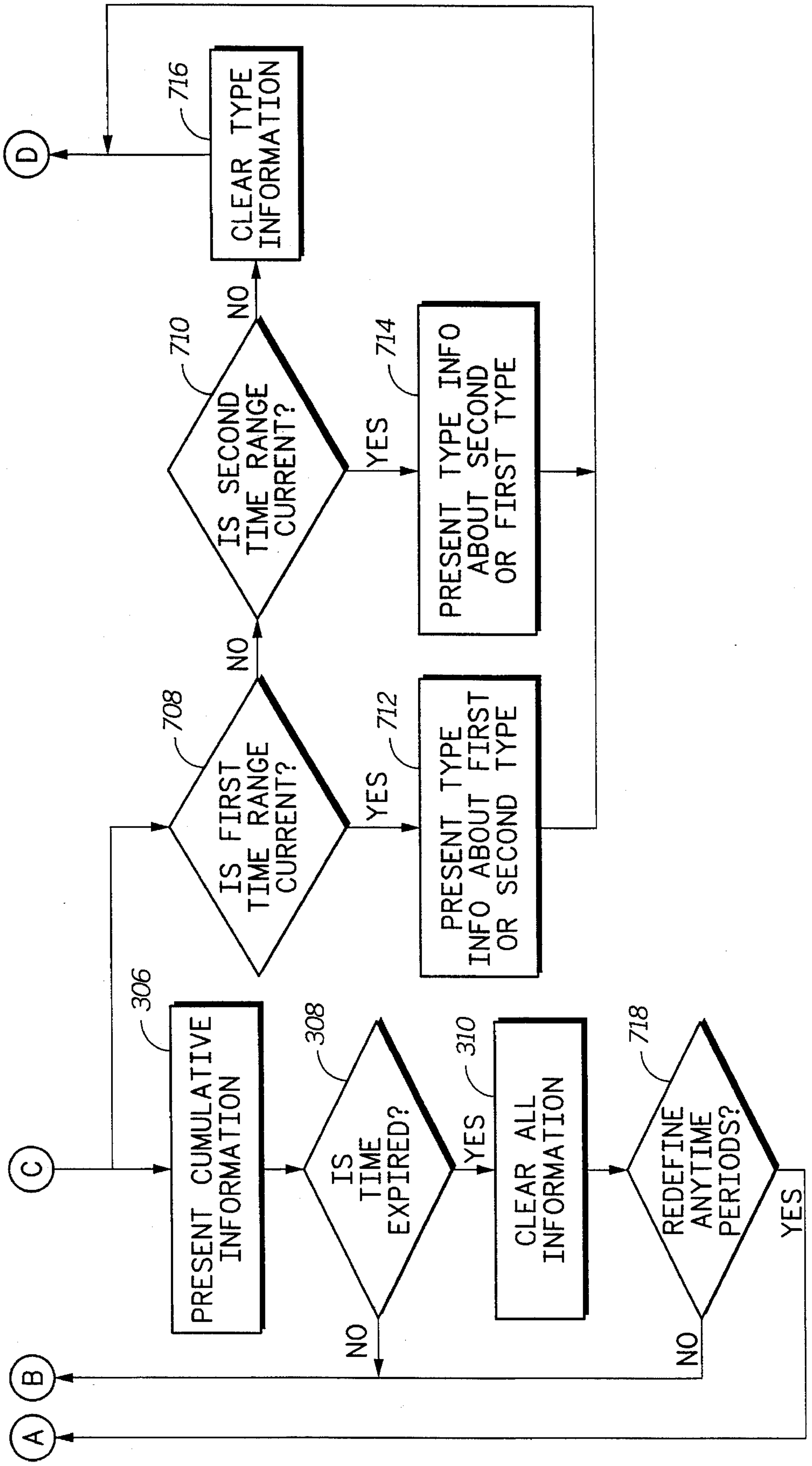

FIGS. 6 and 7 illustrate a method of presenting the messages and the types of messages in accordance with the preferred embodiment of the present invention. Using the controls 114, the user defines 302 a period of time during which information about the messages received 304 during the period of time is displayed 306 on the standby information display 202 (FIG. 2). The microprocessor 104 (FIG. 1) monitors the time, and, when the period of time has expired 308, the standby information display 202 is cleared 310 of the information about the previously received messages. Information about messages received 304 during a subsequent period of time is then displayed 306 on the standby information display 202.

If the pager is to receive different types of messages, the user defines at least a first time range 602 during which he prefers to be presented with a first type of message and a second time range 604 during which he prefers to be presented with a second type of message. Although FIG. 6 depicts the steps of defining 602, 604 the first and the second time ranges, the method in accordance with the preferred embodiment of the present invention is not restricted to receiving and displaying information about only two types of messages. After the pager receives 304 each message, the microprocessor 104 determines 606 the type of message received and determines 708, 710 if either of the time ranges is current. If the first time range is current 708, type information about the messages of the first type received 304 during the first time range is displayed 712 on the standby information display 202. Type information about the messages of the second type received 304 during the first time range may also be displayed 712 on the standby information display 202. If the second time range is current 710, type information about the messages of the second type received 304 during the second time range is displayed 714 on the standby information display 202. Type information about the messages of the first type received 304 during the second time range may also be displayed 714 on the standby information display 202. If neither time range is current 708, 710, the type information is cleared 716, and the information displayed 306 on the standby information display 202 simply consists of the information about the messages received 304 during the period of time. When the period of time expires 308, all message information is cleared, including the information about the types of messages. The step of redefining 718 the period of time, the first time range, or the second time range is shown as occurring after the standby information display 202 is cleared 310 of the information, however, this step may actually occur at any time during normal operation of the pager. Because the pager is able to display information about several types of received messages on the standby information display, the user is easily able to see the various types of messages which have been received. Additionally, the user may choose to be presented with, or, alternatively, ignore, a message of a particular type received during a specific time. For example, the user may, after consulting the standby information display, decide to delay the presentation of a received message of a particular type until a more convenient time.

Figure 8:
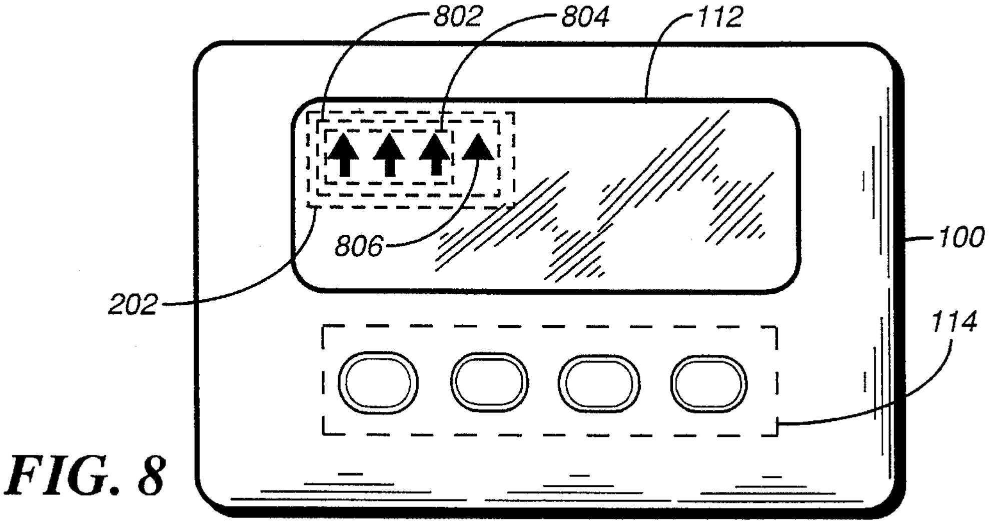
FIG. 8 is an illustration of a selective call receiver incorporating a standby information display in accordance with the preferred embodiment of the present invention.

FIG. 8 illustrates a possible display of type information on the standby information display 202 in accordance with the preferred embodiment of the present invention. If a total of four messages have been received 304 (FIG. 6) during the period of time, four indicators 802 may be shown on the standby information display 202. Three full arrow indicators 804 may indicate that three work related messages have been received during work hours, while a half arrow indicator 806 may indicate that a non-work related message has been received during work hours. The user may choose, by manipulation of the controls 114, to read any of the messages at any time.

The use of the standby information display 202 allows information to be presented in a manner that is easy for the user to understand. The user is able to identify not only basic information about the received messages, such as the number of messages received within a defined period of time and the number of unread messages, but also information about the types of messages received. Because the pager continues to receive all types of messages during the time ranges when the user prefers to read only a specific type of message, the user does not miss critical messages, and the option to read the messages at a later time is preserved. In addition, the user may advantageously select messages depicted on the standby information display 202 to be presented by the presentation device 112. The use of the standby information display 202 in accordance with the preferred embodiment of the present invention allows the user to easily decipher information about the incoming messages and the messages stored in the memory, and more easily locate and read specific messages stored in the memory. By now it should be appreciated that there has been provided a better method for configuring the presentation of received messages and types of received messages based on time.

We claim:

1. A selective call receiver for presenting a plurality of messages to a user, the selective call receiver comprising:

receiver means for receiving messages;

timing means coupled to the receiver means for recording times that the messages are received;

storage means coupled to the timing means and the receiver means for storing the messages and the times corresponding thereto;

user actuated control means coupled to the storage means for user selectably defining a previous time range; and presenting means coupled to the user actuated control means and the storage means for presenting a standby information display that is automatically generated in response to the previous time range, wherein the standby information display includes icons representative of messages received during the previous time range.

2. In a selective call receiver having a display, a method for configuring the presentation of received messages, comprising the steps of:

(a) user selectably defining, without resetting the selective call receiver, a period of time during which information about messages received during the period of time will be visually presented;

(b) receiving the messages during the period of time;

(c) substantially coincident with step (b), presenting the information about the messages received during the period of time on a standby information display, wherein the information included in the standby information display is distinct from the messages themselves; and (d) after expiration of the period of time, automatically and without further user intervention presenting information about messages received during a subsequent period of time on the standby information display.

3. The method in accordance with claim 2, further comprising the steps of:

(e) user selectably defining a previous time range during which information about previously received messages will be visually presented;

(f) determining which previously received messages were received during the defined previous time range; and (g) presenting the information about the previously received messages received during the defined previous time range on the standby information display.

4. In a selective call receiver for receiving at least a first and a second type of message, a method for configuring the presentation of received messages, comprising the steps of:

(a) user selectably defining a period of time during which information about messages received during the period of time will be visually presented;

(b) user selectably defining, without resetting the selective call receiver, a first time range during which information about messages of the first type received during the first time range will be visually presented;

(c) receiving the messages;

(d) substantially coincident with step (c), presenting the information about the messages received during the period of time on a standby information display, wherein the information about the messages received during the period of time is distinct from the messages themselves;

(e) determining the type of each message received during the first time range;

(f) substantially coincident with step (c), presenting the information about the messages of the first type received during the first time range on the standby information display, wherein the information about the messages of the first type received during the first time range is distinct from the messages themselves; and (g) after expiration of the period of time, presenting information about messages received during a subsequent period of time on the standby information display automatically and without further user intervention.

5. The method in accordance with claim 4, further comprising the steps of:

(h) user selectably defining a previous time range during which information about previously received messages will be visually presented;

(i) determining which previously received messages were received during the defined previous time range; and (j) presenting the information about the previously received messages received during the defined previous time range on a standby information display.

6. The method in accordance with claim 4, further comprising the step of:

(k) after expiration of the first time range, presenting information about messages received during a subsequent first time range on the standby information display.

7. The method in accordance with claim 6, further comprising the steps of:

(l) prior to step (c), user selectably defining a second time range during which information about messages of the second type received during the second time range will be visually presented;

(m) subsequent to step (c), determining the type of each message received during the second time range; and (n) substantially coincident with step (c), presenting the information about the messages of the second type received during the second time range on the standby information display.

8. The method in accordance with claim 7, further comprising the step of:

(o) alerting the user to reception of a message with an alert.

9. The method in accordance with claim 8, wherein step (o) comprises the steps of:

(p) alerting the user with a first alert to reception of a message of the first type during the first time range or to reception of a message of the second type during the second time range; and (q) alerting the user with a second alert to reception of a message of the first type during the second time range or to reception of a message of the second type during the first time range.

10. The method in accordance with claim 7, further comprising the step of:

(r) after expiration of the second time range, presenting information about messages of the second type received during a subsequent second time range on the standby information display.

11. The method in accordance with claim 10, further comprising the steps of:

(s) user selectably defining a previous time range during which information about previously received messages will be visually presented;

(t) determining which previously received messages were received during the defined previous time range; and (u) presenting the information about the previously received messages received during the defined previous time range on the standby information display.

12. In a selective call receiver having a display, a method for presenting previously received messages, comprising the steps of:

(a) user selectably defining a previous time range during which icons representing previously received messages will be visually presented;

(b) determining which previously received messages were received during the defined previous time range; and (c) presenting the icons representing the previously received messages received during the defined previous time range on a standby information display.

* * * * *